United States Patent Office 3,776,976
Patented Dec. 4, 1973

---

3,776,976
PROCESS FOR THE PRODUCTION OF POLYMERS CONTAINING N-SUBSTITUTED ACRYLIC ACID AMIDES AND/OR METHACRYLIC ACID AMIDES
Theodor Volker and Hanspeter Hugener, Freiburg, Switzerland, assignors to Lonza Ltd., Basel, Switzerland
No Drawing. Filed July 13, 1971, Ser. No. 162,292
Claims priority, application Switzerland, July 14, 1970, 10,652/70
Int. Cl. C08g *20/38*
U.S. Cl. 260—780 A       6 Claims

ABSTRACT OF THE DISCLOSURE

A process for the production of polymers containing N-substituted acrylic acid amides and/or methacrylic acid amides comprises reacting polyacrylic acid imide and/or polymethacrylic acid imide or polymers containing acrylic acid imide and/or methacrylic acid imide groups at a temperature of 0° C. to 120° C. with an amine of the formula $RCH_2NH_2$ in which R is H, alkyl, aryl, aralkyl, hydroxyalkyl or carboxyalkyl. The amide polymers are useful as flocculation and disperison agents.

BACKGROUND OF THE INVENTION (a) Field of the invention

The invention relates to a process for producing polymers containing N-substituted acrylic acid amides and/or methacrylic acid amides.

(b) Description of the prior art

Processes for the production of polymers containing acrylic acid imide and methacrylic acid imide groups have been known for some time. Such processes include: the heating of polymethacrylic acid in the presence of urea (U.S. patent specification No. 2,146,209); the dry heating of copolymers of methacrylic acid and methacrylamide (German patent specification No. 1,023,014); the heating of a copolymer of methacrylic acid amide and methacrylic acid esters in the presence of water [DAS (German published specification) No. 1,113,308]. More recently, there has been discovered the polymer-analogous formation of imide groups by heating copolymers of (meth)acrylic acid and (metha)acrylonitrile [G. Schröder, "Angew. Makromol. Chem." 11 (1970), 91–108].

It is also known to react methacrylic acid imides in the presence of water with a primary amine at a temperature above 130° C. to obtain N-alkylated polymethacrylic acid imides [DAS (German published specification) No. 1,165,861].

SUMMARY OF THE INVENTION

An object of the invention is to prepare polymers containing N-substituted acrylic acid amide and/or methacrylic acid amide units which are in a position adjacent unsubstituted amide units.

This is achieved according to the invention by reacting polyacrylic acid imide and/or polymethacrylic acid imide, or polymers containing acrylic acid imide and/or methacrylic acid imide groups at temperatures of 0° C. to 120° C. with amines of the formula $RCH_2NH_2$ in which R is H, alkyl, aryl, aralkyl, hydroxyalkyl or carboxyalkyl.

The reaction is preferably carried out at 20 to 70° C. The pressure to be applied is not critical and depends on the volatility of the amines.

The reaction may be carried out in a suspension or in solution. If it is carried out in a suspension, the starting polymers are advantageously used in an aqueous or water-containing suspension. The reaction in suspension is expedient, especially when water-soluble final products are prepared and these should be already present in solution.

In the second case organic water-miscible solvents are used in which the starting polymers are also insoluble, e.g. lower alcohols and/or ketones. These are advantageously mixed with 5 to 20% of water in order to accelerate the reaction (in the case of anhydrous solvents, a sufficiently rapid conversion is only achieved in methanol). This method is advantageous when it is desired that the final product which may also be insoluble in the organic solvent used for the suspension, be immediately obtained in the form of a powder.

When the process is carried out in solution, it is advantageous to use dimethyl formamide to which small amounts of water may be added.

Suitable starting compounds are homopolymers of acrylic acid imide or methacrylic acid imide. It is also possible to use copolymers with acrylic acid, methacrylic acid, acrylic acid esters, methacrylic acid esters (the methyl, ethyl, propyl, butyl, amyl, hexyl, cyclohexyl esters) as well as with other monomers such as acrylonitrile or methacrylonitrile, vinyl chloride, vinylidene chloride, vinyl ester (vinyl propionate).

The use of copolymers containing at least 10 mol percent of imide groups, referred to the polymer, is preferred. The molecular weight of the starting polymer is not critical and depends on the field of application; if, for example, the final products are used as flocculation agents, the molecular weight advantageously is 80,000 to over 500,000; if the molecular weight is lower than 80,000 to 30,000 the products have dispersing properties.

Depending on the chosen starting polymer and amine $(RCH_2NH_2)$, it is possible to obtain specific N-substituted polyamides with different properties.

When the process is carried out with water, the amount of water to be used mainly depends on practical considerations. For low molecular products, an approximately five-fold amount will be sufficient; for high-molecular products, a 20- to 200-fold amount of water is used in order to ensure stirrability.

All primary amines and amine compounds can be used as the compound $RCH_2NH_2$. The radical R preferably refers to an alkyl group with about 1 to 6, and particularly, about 1 to 4 carbon atoms, a corresponding hydroxyalkyl group or carboxyalkyl group or a phenyl group. The amount depends on the imide content in the polymer. It is expedient to work with equivalent amounts, although an excess is also possible. In the last-mentioned case, the unreacted amine can be removed, for example, by concentrating the solution by evaporation, or by steam distillation. If amino acids are used as the amine compound, the alkali metal salt is preferred to the free acid.

The polymer which can be obtained according to the process of the invention contain N-substituted amide groups in adjacent positions. The reaction of the polyacrylimide, for example, proceeds according to the following equation:

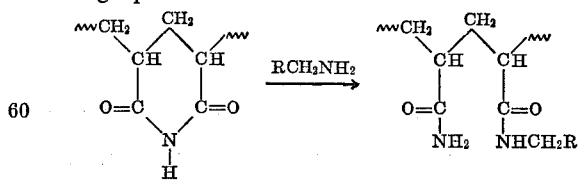

The new polymers are generally suitable as colloids and can be used as flocculation agents, paper and textile auxiliaries and as thickening agents.

DESCRIPTION OF PREFERRED EMBODIMENTS

Examples

The starting polymers listed below were reacted according to the table. The abbreviations for the starting polymers as shown below are used in the table.

(1) Polyacrylimide — PAI I MW=60,000
(2) Polyacrylimide — PAI II MW over 500,000
(3) Copolymer of acrylimide and methyl methacrylate 60:40. — PAI/MMA I
(4) Copolymer of acrylimide and methyl methacrylate 75:25. — PAI/MMA II
(5) Polymethacrylimide, prepared acc. to G. Schröder, Angew. Makromol. Chem. 11 (1970), p. 105–107. — PMAI
(6) Copolymer of acrylimide and acrylic acid with approx. 20 mol percent acrylic acid. — PAI/AS
(7) Copolymer of methacrylimide and methacrylonitrile with approx. 50% methacrylonitrile. — PMAI/MAN
(8) Poly(methacryl-/acryl-)imide, prepared acc. to G. Schröder, Angew, Makromol. Chem. 11 (1970), p. 105–107. — P(MA/A) I

We claim:

1. A process for the production of N-substituted polyacrylic acid amides or polymethacrylic acid amides, said process comprising reacting solid polyacrylic acid imide or solid polymethacrylic acid imide, at a temperature of 0° C. to 120° C. with an amine of the formula $RCH_2NH_2$ in which R is H, alkyl, aryl, aralkyl, hydroxyalkyl or carboxyalkyl, the amine being present in at least a stoichiometric amount to provide in the final polymer one amide group and one N-substituted amide group on adjacent carbon atoms in the chain of the starting polymer which were attached in the respective imide group.

2. The process according to claim 1 wherein the reaction is carried out at a temperature of 20 to 70° C.

3. The process according to claim 1 comprising suspending the starting polymer in water and effecting the reaction in suspension.

4. The process according to claim 1 comprising suspending the starting polymer in an organic inert solvent, and effecting the reaction in suspension.

5. The process according to claim 4 comprising adding water to said organic solvent.

6. The process according to claim 1 comprising dissolving the starting polymer in an inert solvent and effecting the reaction in solution.

| Polyimide | | Amine | | Reaction medium | | Reaction time, hrs. | Reaction temperature, °C. | Prod., g. | Test [1] |
|---|---|---|---|---|---|---|---|---|---|
| G. | Type | G. | Type | G. | Type | | | | |
| 2.0 | PAI I | 2.0 | Ethanolamine | 10.0 | Water | 3 | 40 | 2.7 | Di |
| 2.0 | PAI I | 2.0 | Ethylamine | 10.0 | do | 2 | 40 | 2.5 | Di |
| 2.0 | PAI I | 2.3 | Butylamine | 10.0 | do | 2 | 40 | 3.0 | Di |
| 2.0 | PAI I | 2.0 | Ethanolamine | 10.0 | do | ½ | Reflux | 2.7 | Di |
| 2.0 | PAI II | 1.14 | Butylamine | 40.0 | do | 2 | 40–50 | 2.9 | Fl |
| 2.0 | PAI II | 0.95 | Ethanolamine | 40.0 | do | 2 | 40–50 | 2.7 | Fl |
| 2.0 | PAI II | 1.67 | Benzylamine | 40.0 | do | 2 | 40–50 | 3.3 | Fl |
| 2.0 | PAI II | 1.0 | Ethylamine | 40.0 | do | 2 | 40–50 | 2.4 | Fl |
| 2.0 | PAI II | 1.1 | Glycine/0.6 g. NaOH | 20.0 | do | 3 | 50 | 3.7 | Di |
| 2.0 | PAI II | 2.0 | Butylamine | 20.0 | Methanol | 3 | Reflux | 2.1 | Fl |
| 2.0 | PAI II | 2.0 | do | { 16.0 / 4.0 } | { Methanol / Water } | 3 | Reflux | 2.4 | Fl |
| 2.0 | PAI II | 2.0 | do | { 16.0 / 4.0 } | { Isopropanol / Water } | 3 | Reflux | 2.3 | Fl |
| 2.0 | PAI II | 2.0 | do | { 16.0 / 4.0 } | { Acetone / Water } | 3 | Reflux | 2.3 | Fl |
| 2.0 | PAI II | 2.0 | do | { 16.0 / 4.0 } | { DMF / Water } | 2 | 70 | 3.0 | Fl |
| 2.0 | PAI/MMA I | 1.0 | Butylamine | 40.0 | Water | 24 | 20 | 2.6 | Fl |
| 2.0 | PAI/MMA II | 2.0 | do | 40.0 | do | 24 | 20 | 2.6 | Fl |
| 2.0 | PAI/AS | 0.5 | do | 50.0 | do | 2 | 40–50 | 2.5 | Fl |
| 2.0 | PAI/AS | 2.0 | do | 50.0 | do | 2 | 40–50 | 3.1 | Fl |
| 2.0 | PMAI | 2.0 | do | 40.0 | do | 15 | 20 | 2.3 | Di |
| 2.0 | PMAI/MAN | 3.0 | do | 40.0 | do | (³) | (³) | 2.5 | Fl |
| 2.0 | PMAI/MAN | 3.0 | Ethanolamine | 40.0 | do | 15 | 20 | 2.3 | Di |
| 2.0 | PMAI/MAN | 3.0 | Butylamine | 40.0 | DMF | 15 | 20 | 2.5 | Fl |
| 2.0 | P(MA/A) I | 2.0 | do | 40.0 | Water | 15 | 20 | 3.0 | Fl |

[1] Di=dispersion, Fl=flocculation.
[2] 1 h/20.
[3] ½ h/reflux.

References Cited

UNITED STATES PATENTS 3,639,357  2/1972  Cohen _____ 260—78 UA

FOREIGN PATENTS 1,165,861  10/1964  Germany.

HAROLD D. ANDERSON, Primary Examiner

U.S. Cl. X.R.

260—78 A, 88.3 R, 89.7 R